United States Patent [19]

MacLeod, Jr. et al.

[11] Patent Number: 4,475,700
[45] Date of Patent: Oct. 9, 1984

[54] TAPE CASSETTE DUST DOOR LATCH SPRING ASSEMBLY

[75] Inventors: Robert B. MacLeod, Jr., Kennebunkport; Vincent E. Landry, Saco; Paul J. Gelardi, Cape Porpoise, all of Me.

[73] Assignee: Shape Inc., Biddeford, Me.

[21] Appl. No.: 493,021

[22] Filed: May 9, 1983

[51] Int. Cl.³ .......................... G03B 1/04; G11B 15/32
[52] U.S. Cl. .............................. 242/197; 29/DIG. 28; 242/199; 206/389
[58] Field of Search ................................ 242/197–200, 242/55, 19 A; 360/132; 206/389, 393, 406, 387; 220/4 R, 4 E, 334, 339, 326; 29/428, DIG. 28

[56] References Cited

U.S. PATENT DOCUMENTS

| | | | |
|---|---|---|---|
| 3,735,939 | 5/1973 | Inaga | 242/198 |
| 3,809,219 | 5/1974 | Esashi | 220/326 |
| 4,022,395 | 5/1977 | Kishi | 242/198 |
| 4,180,220 | 12/1979 | Shiba et al. | 242/199 |
| 4,323,207 | 4/1982 | Gebeke | 242/198 |
| 4,418,373 | 11/1983 | Fujimori et al. | 360/132 |

Primary Examiner—Leonard D. Christian
Attorney, Agent, or Firm—Staas & Halsey

[57] ABSTRACT

A tape cassette dust door latch, a dust door latch spring assembly and a related method for assembling the dust door latch into the tape cassette. The dust door latch has a lock plate with a boss projecting perpendicularly therefrom and a coil spring with first and second ends, the first end of the spring surrounding the boss and the second end of the spring being a free end. The cassette has an upper half case and a lower half case, the upper half case having an abutment member located in the vicinity of the lock plate, and the lower half case having a means for rotatably receiving the dust door latch. In the method of assembling, first, the dust door latch is inserted into the receiving means in the lower half case, and then the upper half case is assembled onto the lower half case such that the abutment member receives the free end of the coil spring, directs it downwardly, and holds the coil spring in a biased position. This dust door latch, dust door latch spring assembly and the method for assembling the dust door latch into the tape cassette provide more efficient production and automated assembly of tape cassettes.

12 Claims, 6 Drawing Figures

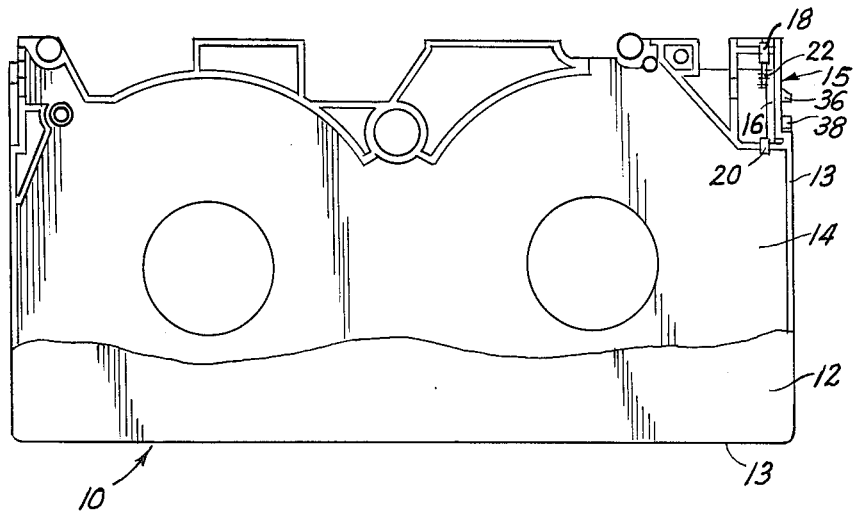
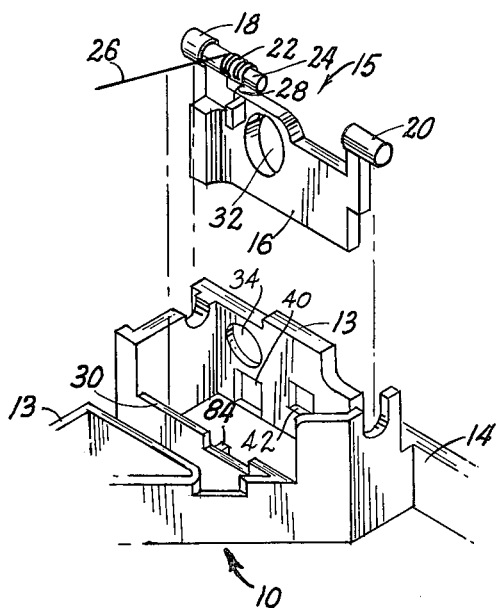
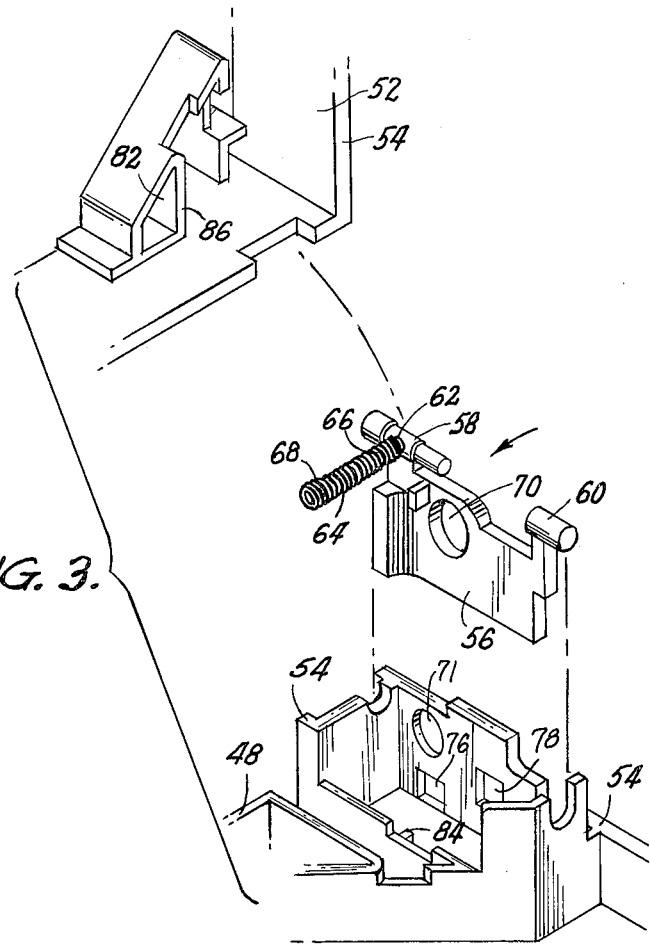

TAPE CASSETTE DUST DOOR LATCH SPRING ASSEMBLY

BACKGROUND OF THE INVENTION

This invention relates to a tape cassette, and more particularly to a spring-biased latch for a tape cassette dust door.

For convenience of reference when describing the prior art and the present invention, "inward" means in the direction toward the interior of the cassette from its sides, "outward" means in the direction toward the sides of the cassette from its interior, "upward" means in the direction toward the upper half of the cassette from the lower half, and "downward" means in the direction toward the lower half of the cassette from the upper half.

A tape cassette usually comprises, among other things, a hinged dust door and a latch capable of temporarily locking the dust door closed. The dust door protects the tape in the cassette when the cassette is not being used. The latch is often made of a flat, rectangular lock plate rotatably supported by lateral pivot pins which rest in the lower half of the tape cassette. The lock plate is urged by a torsion spring toward the inward surface of the side wall of the lower half of the cassette. Two square projections on the outward side surface of the lock plate extend through corresponding openings in this side wall of the lower half of the cassette. One of the projections engages an opening in the side of the dust door when the dust door is in the closed position, thereby locking the dust door against opening. When the tape cassette is inserted into a tape player/recorder the latter projection is automatically depressed and the dust door is allowed to open to expose the tape for operation of the tape player/recorder.

The torsion spring used to bias the dust door latch usually has a short and a long leg. The spring is assembled about a shaft which is connected on the top of and parallel to the lock plate. The "legs" of the torsion spring must be correctly assembled in opposing relation to create "torsion" and, therefore, effect biasing of the lock plate normally toward the inward surface of the side wall of the lower half of the cassette, i.e., in the dust door "lock" position. To correctly assemble the torsion spring into the cassette, the spring is usually first pre-loaded about the shaft of the lock plate with the small leg abutting the inward surface of the lock plate, and then the dust door latch must be inserted into the lower half of the cassette to rest on the pivot pins. Alternatively, the lock plate may be inserted into the housing before the torsion spring is positioned on the shaft. In either case, once the lock plate is in place, the long leg must be separately positioned to oppose the force of the short leg. Thus, the long leg must be inserted against the outward side of a vertical wall in the vicinity of the lock plate. Finally, the upper half of the housing is put onto the lower half.

Thus, four assembly steps are normally required for prior art dust door latch assemblies, i.e. assembly of the spring (including positioning the short leg) onto the lock plate, insertion of the lock plate into the housing, positioning the long leg against the housing to oppose the force of the short leg, and, finally, putting the upper and lower halves of the cassette together.

For example, U.S. Pat. No. 4,173,319, issued to Umeda, discloses a torsion spring 45 used to press the lock plate 43 against the inner surface of the side wall of the housing. This spring is mounted to a shaft extending from a pivot pin 44 parallel to the lock plate 43.

The Umeda '319 patent described above is exemplary of the relatively inefficient assembly of dust door latch assemblies, i.e., Umeda signifies the four step assembly of pre-loading the torsion spring on the lock plate, inserting the lock plate into the cassette housing, correctly positioning the long leg of the torsion spring, and joining the two halves of the cassette.

SUMMARY OF THE INVENTION

Accordingly, it is an object of the present invention to provide a coil spring-biased dust door latch which can be assembled in a cassette housing in fewer steps than known in the prior art, while providing a dust door latch capable of the most cost-efficient manufacture.

It is another object of the present invention to provide a coil spring-biased dust door latch requiring relatively simple parts, therefore, being capable of the most cost-efficient manufacture.

It is another object of the present invention to provide a coil spring-biased dust door latch which can be efficiently assembled by automation.

It is still another object of the present invention to provide a spring-biased dust door latch assembly capable of quick and easy automated assembly into a cassette housing.

Finally, it is another object of the present invention to provide a method for assembling a dust door latch, including the steps of loading a coil spring onto a lock plate, inserting the lock plate into the housing of a cassette and directing the coil spring into a biased position while the upper half case is assembled on the lower half case.

To achieve the foregoing and other objects of the invention and in accordance with the purpose of the invention, there is provided a tape cassette dust door latch using a coil spring fitted over a boss which extends perpendicularly from a pivot pin on the lock plate.

There is also provided a coil spring-biased dust door latch assembly, wherein the coil spring of the dust door latch assembled in the tape cassette housing is loaded into a biased position as the top half of the cassette is placed thereon. More particularly, the present invention teaches a verticle abutment wall in the cassette top half which combines with the coil spring of the dust door latch as the upper half is assembled on the lower half to direct and hold the spring in a biased position.

Finally, there is provided a method for assembling a dust door latch wherein a coil spring, which is positioned on a lock plate, is used in combination with the abutment wall of the upper half of the cassette to result in facilitated automated assembly of a spring-biased dust door latch within a cassette housing.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a top plan cut-away view of a prior art cassette housing, illustrating particularly the position of the prior art dust door latch;

FIG. 2 is an exploded partial view of a prior art cassette dust door latch, illustrating particularly the position of the torsion spring on the lock plate;

FIG. 3 is an exploded, partial view of the dust door latch and dust door latch assembly of the present invention;

DETAILED DESCRIPTION OF THE PREFERRED EMBODIMENTS

Figure 4:
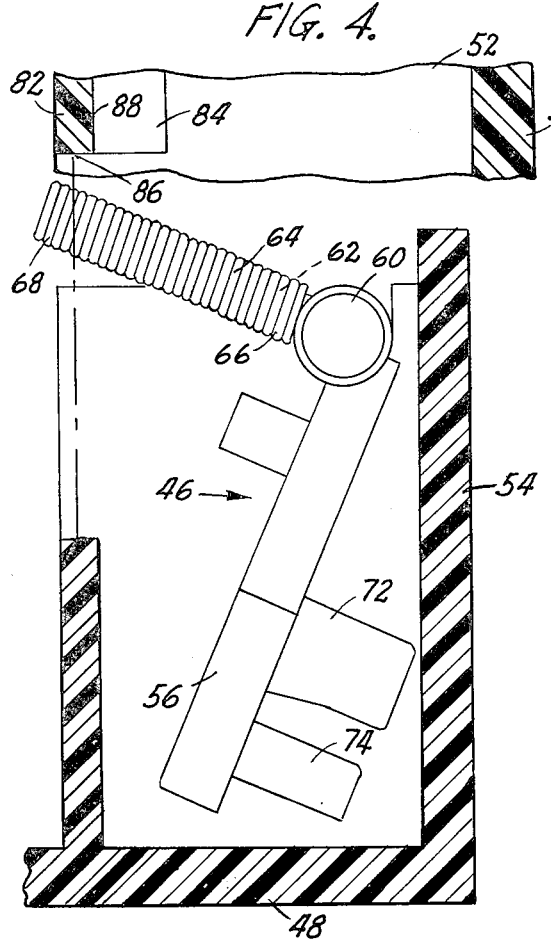
FIG. 4 is a side, exploded, cross-sectional view of the dust door latch assembly of the present invention, illustrating particularly the position taken by the abutment wall of the upper half of the cassette housing, which combines with the coil spring for assembly of the dust door latch into the housing.

As shown in FIGS. 1 and 2, a conventional tape cassette housing 10 has a flat, substantially rectangular configuration which may be formed of a suitable plastic and consists of an upper half case 12 and a lower half case 14; each half case 12 and 14 have side walls 13. Tape reels (not shown) are usually suitably located in side-by-side relation within the cassette housing 10 so as to be freely rotatable, and a magnetic tape (not shown) is wound on the tape reels in operation.

In the housing there is usually positioned a dust door latch 15, including a lock plate 16 which is rotatably supported by lateral pivot pins 18 and 20 and is urged outwardly by a torsion spring 22 against the inner surface of the side wall 13 of the lower half case 14.

The torsion spring 22 is usually assembled about a shaft 24 which is connected above and parallel to the lock plate 16 and which extends from the pivot pin 18. The long and short "legs", 26 and 28, respectively, of the torsion spring 22 must be correctly assembled to create "torsion" and, therefore, effect biasing of the lock plate normally toward the inner surface of the side wall 13 of the cassette housing, i.e., in the dust door "lock" position. Usually, the torsion spring 22 is first pre-loaded on the lock plate 16, with the short leg 28 abutting the inward surface of the lock plate 16, before the lock plate 16 is put into position in the lower half case 14 of the cassette housing 10. Alternatively, the lock plate 16 may be inserted into the housing 10 before the torsion spring 22 is positioned on the shaft 24. In either case, to effect proper "torsion" the long leg 26 of the torsion spring 22 must be positioned to oppose the short leg 28 by abutting the long leg 26 against the outward side of wall 30 in the lower half case 14. This is accomplished by manually moving the long leg 26 into position against the wall 30 after the short leg 28 is in position abutting the inner surface of the lock plate 16. Of course, after inserting the long leg 26 against the wall 30, the upper half case 12 is assembled onto the lower half case 14.

Thus, the assembly steps that are required to assemble the prior art dust door latch are: (1) putting the torsion spring 22 on the shaft 24; positioning the lock plate 16 into the lower half case 14 of the housing 10; (3) separately positioning the long leg 26 of the spring 22 against the wall 30; and finally (4) assembling the upper half case 14 onto the lower half case 12.

The lock plate 16 also has an opening 32 and the lower half case 12 has a corresponding opening 34 (see FIG. 2). The openings 32 and 34 allow light to pass through the tape cassette during use, as is well known in the art. The lock plate 16 has projections 36 and 38 (see FIG. 1) on its outward side surface for projecting through openings 40 and 42, respectively, in the side wall 13 of the lower half case 14. Projection 36 engages a recess in the side of the dust door (not shown) when it is closed, thereby locking the dust door against opening.

FIG. 3 illustrates the dust door latch 46 according to the present invention, the lower half case 48 of the housing 50 into which it is inserted, the upper half case 52 of the housing 50 which is eventually fitted on the lower half case 48, and the side walls 54 of each half case, 48 and 52.

As also seen in FIG. 3, the dust door latch 46 according to the present invention comprises a lock plate 56 having a pivot pin 58 at one end and a pivot pin 60 at the other end. In addition, there is a connecting means for connecting a spring means to the lock plate 56 extending from pivot pin 58 of the lock plate 56. In the preferred embodiment, the connecting means is a boss 62 which extends perpendicularly from the pivot pin 58.

A spring means is also a part of the dust door latch 46. In the preferred embodiment, the spring means is a coil spring 64, the coil spring 64 has a first end 66 attached to the boss 62 and a second end 68 which is a free end before assembly into the cassette housing 50.

Other types of spring means might be used instead of a coil spring, e.g., a metal band extending perpendicularly from the lock plate, as long as the spring can be bent to normally push the lock plate toward the side wall. Accordingly, if a metal band is used as the spring means, the connecting means would have a configuration for holding the metal band.

The lock plate 56 of the present invention also has an opening 70, and projections 72 and 74 (see FIG. 5), which project through openings 76 and 78 formed in the lower half case 48, for locking the dust door 80. Of course, the lower half case 48 also has an opening 71, corresponding to opening 70 for allowing light to pass through the cassette.

A description of the dust door latch assembly of the present invention now follows, with reference being made to FIGS. 3-6. There is formed on the upper half case 52 of the present invention an abutment wall 82 for receiving and holding in abutting relationship the second end 68 of the coil spring 64. The abutment wall 82 is preferably formed substantially perpendicularly to the plane of the base of the lower half 48 of the cassette housing 50. Positioned on the abutment wall 82 is a rib 84 which aids in keeping the coil spring 64 from slipping along the abutment wall 82 during assembly or operation. The abutment wall 82, along with the second end 68 of the coil spring 64, provides efficient means for inserting the coil spring into biasing position while the upper half case 52 is assembled on the lower half case 48, which method of assembly will now be described.

FIGS. 3-6 also illustrate the method for assembling the dust door latch assembly into the cassette housing, according to the present invention. As can be seen from FIGS. 3 and 4, the coil spring 64 is first attached to the boss 62 and then the dust door latch 46 with the coil spring 64 attached thereto is inserted in the housing 50. The upper half case 52 is then put on the lower half case 48.

Figure 5:
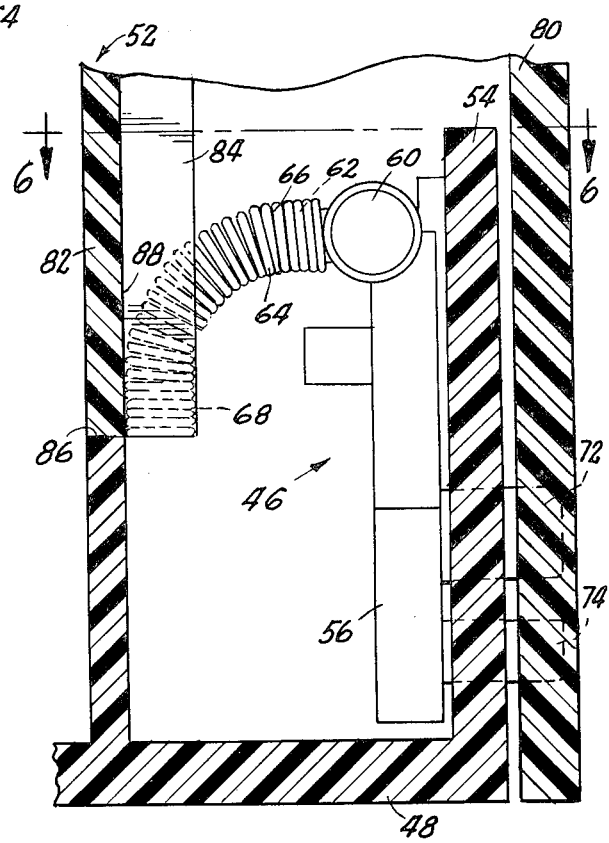
FIG. 5 is a side, cross-sectional view of the dust door latch assembly of the present invention, illustrating particularly the coil spring of the dust door latch assembled in the cassette housing.
Figure 6:
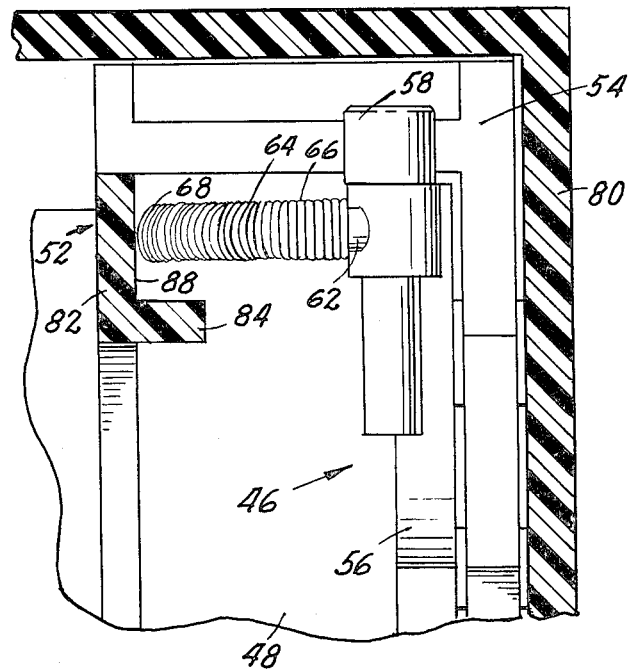
FIG. 6 is a top, cut-away view of the dust door latch assembly shown in FIG. 5, illustrating particularly the position taken by the coil spring against the abutment wall of the upper half of the housing after the upper half of the housing is assembled on the lower half of the housing.

More particularly, as the upper half case 52 is being inserted on a lower half case 48, the downward edge 86 of the abutment wall 82 receives the top of the second end 68 of coil spring 64 and bends the coil spring 64 as it pushes it downwardly, as shown in FIGS. 4 and 5. When the edges of the side walls 54 of the upper half case 52 are flush with the edges of the sidewalls 54 of the lower half case 48, the coil spring 64 has been completely bent, has left abutment with the edge 86 of the abutment wall 82 and has come to rest along the outward side 88 of the abutment wall 82.

The coil spring 64 is now in biased operating position against the abutment wall 82 and effectively urges the lock plate 56 toward the inward surface of the side wall 54 of the lower half case 48. The dust door latch is now spring loaded for operation. See FIGS. 5 and 6.

It can be seen from the above description that the present invention provides a tape cassette dust door latch spring assembly using relatively few parts, allowing automatic assembly of the dust door latch in a cassette housing, and using an assembly with fewer steps than known in the prior art, thus effecting more time and cost-efficient manufacture and production.

The above-described dust door latch, dust door latch assembly and method therefore, have been shown to be of the type intended for use in video tape recorders. However, the invention can be similarly applied to tape cassettes for use in audio or other recording and/or reproducing apparatus.

The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention and the appended claims and their equivalents.

We claim:

1. A tape cassette dust door latch, comprising:
   (a) a lock plate;
   (b) a boss integrally formed on the lock plate and extending perpendicularly relative to the plane of the lock plate;
   (c) a coil spring having first and second ends, wherein the first end is connected to the boss and the second end is a free end; and
   (d) first and second pivot pins formed on the lock plate extending in a plane parallel to the lock plate, wherein the boss extends perpendicularly from the first pivot pin.

2. A dust door latch assembly for a tape cassette, the assembly comprising:
   (a) a cassette housing having an upper half case and a lower half case, the upper half case having abutment means for abutting a dust door latch and the lower half case having means for receiving the dust door latch; and
   (b) a dust door latch having:
      (i) a lock plate with first and second pivot pins located thereon,
      (ii) connecting means located on the lock plate for connecting a spring means to the lock plate, and
      (iii) spring means having a first end and a second end, wherein the first end is attached at the connecting means, and wherein after the pivot pins of the dust door latch are positioned in the receiving means of the lower half case and when the upper half case is positioned on the lower half case, the abutment means abuts and directs the second end of the spring means downwardly and holds the spring means in a biased position along the abutment means.

3. The dust door latch assembly recited in claim 2, wherein the spring means is a coil spring.

4. The dust door latch assembly recited in claim 3, wherein the connecting means is a boss.

5. The dust door latch assembly recited in claim 4, wherein the boss is formed integrally of and extends from the first pivot pin.

6. The dust door latch assembly recited in claim 5, wherein the boss extends substantially perpendicularly from the first pivot pin.

7. A method of manufacturing and assembling a dust door latch into a cassette housing, comprising the steps of:
   (a) forming a cassette housing having an upper half case and a lower half case, the lower half case having means for receiving the dust door latch and the upper half case having abutment means for receiving the dust door latch;
   (b) forming a dust door latch having:
      (i) a lock plate with first and second pivot pins located thereon,
      (ii) connecting means located on the lock plate for connecting a spring means to the lock plate, and
      (iii) spring means having first and second ends, wherein the first end is attached at the connecting means; and
   (c) inserting the pivot pins of the dust door latch into the receiving means in the lower half case; and
   (d) placing the upper half case over the lower half case such that the abutment means abuts and directs the spring means downwardly and holds the spring means in a biased position along the abutment means.

8. The method recited in claim 7, wherein the spring means is a coil spring.

9. The method of claim 8, wherein the connecting means is a boss.

10. The method recited in claim 9, wherein the boss is formed integrally of and extends from the first pivot pin.

11. The method of claim 10, wherein the boss extends substantially perpendicularly from the first pivot pin.

12. A dust door latch assembly for a tape cassette, the assembly comprising:
   (a) a cassette housing having an upper half case and a lower half case, both the upper half case and the lower half case having a substantially flat central area and perpendicular sides extending therefrom, the upper half case also having an abutment wall extending perpendicularly from the substantially flat central portion of the upper half case and the lower half case having means for pivotally receiving a dust door latch; and
   (b) a dust door latch having:
      (i) a substantially flat lock plate with first and second pivot pins located thereon, the lock plate being pivotally positioned in the receiving means of the lower half case,
      (ii) a boss extending substantially perpendicularly from the first pivot pin of the lock plate, and
      (iii) a coil spring having first and second ends, wherein the first end is attached to the boss, and wherein when the upper half case is positioned on the lower half case, the perpendicular abutment wall in the upper half case abuts and directs the second end of the coil spring downwardly and holds the spring in a biased position along the abutment wall.

* * * * *